(12) United States Patent
Hornung

(10) Patent No.: US 6,418,213 B1
(45) Date of Patent: *Jul. 9, 2002

(54) COMMUNICATION TERMINAL EQUIPMENT USING PERFORMANCE FEATURE GROUP IDENTIFIERS

(75) Inventor: Thomas Hornung, Eichenau (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,302
(22) PCT Filed: Jul. 15, 1996
(86) PCT No.: PCT/DE96/01285
§ 371 (c)(1),
(2), (4) Date: Jan. 20, 1998
(87) PCT Pub. No.: WO97/04576
PCT Pub. Date: Feb. 6, 1997

(30) Foreign Application Priority Data

Jul. 18, 1995 (DE) .......................................... 195 26 219

(51) Int. Cl.[7] ................................................. H04M 3/42
(52) U.S. Cl. .................................. 379/201.02; 455/435
(58) Field of Search ................. 379/354, 355.01–355.1, 379/356.01, 216.01, 242, 243, 93.01, 93.09, 93.23, 201.01–201.12, 207.01–207.16; 455/414, 432, 435, 445

(56) References Cited

U.S. PATENT DOCUMENTS

| 4,928,306 | A | | 5/1990 | Biswas et al. |
| 5,022,067 | A | | 6/1991 | Hughes |
| 5,365,581 | A | | 11/1994 | Baker et al. |
| 5,386,460 | A | * | 1/1995 | Boakes et al. ................. 379/96 |
| 5,402,477 | A | | 3/1995 | McMahan et al. |
| 5,422,944 | A | * | 6/1995 | Sakai .......................... 379/260 |
| 5,485,511 | A | * | 1/1996 | Iglehart et al. ............... 379/157 |
| 5,579,381 | A | * | 11/1996 | Courville et al. ........... 379/243 |
| 5,619,559 | A | * | 4/1997 | Kennedy .................. 379/93.01 |
| 5,703,940 | A | * | 12/1997 | Sattar et al. ................. 379/201 |
| 5,950,125 | A | * | 9/1999 | Buhrmann et al. .......... 455/435 |
| 6,029,067 | A | * | 2/2000 | Pfundstein ................... 455/435 |

FOREIGN PATENT DOCUMENTS

EP 0 365 200 A2 4/1990

OTHER PUBLICATIONS

"Newton's Telecom Dictionary, 8th Expanded and Updated Edition," Harry Newton, p. 437, Nov. 1994.*

* cited by examiner

Primary Examiner—Ahmad F. Matar
Assistant Examiner—Benny Q. Tieu
(74) Attorney, Agent, or Firm—Bell, Boyd & Lloyd LLC

(57) ABSTRACT

The invention is directed to a method for the determination of performance features for a communication equipment (EG) connected to a switching unit (SWU), whereby a performance-specific group identifier (x, y, z) is stored in the terminal equipment (EG), this identifier (x, y, z), after the connection of the terminal equipment (EG) to the switching unit (SWU), being interrogated by the latter with a call processing (CP), and whereby the performance features (L) made available by the call processing (CP) are prescribed by this group identifier (x, y, z).

2 Claims, 1 Drawing Sheet

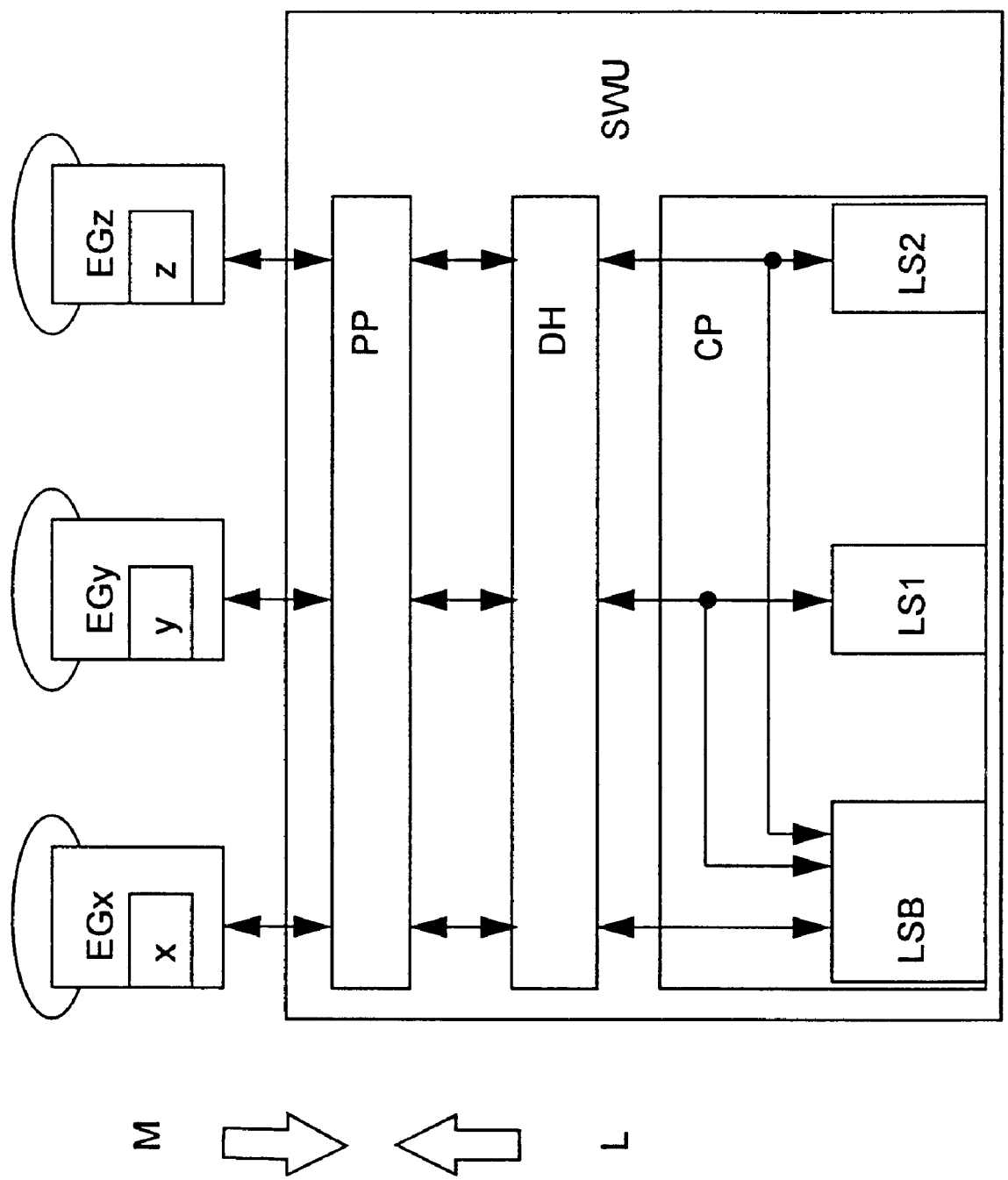

COMMUNICATION TERMINAL EQUIPMENT USING PERFORMANCE FEATURE GROUP IDENTIFIERS

BACKGROUND OF THE INVENTION

1. Field of the Invention

The invention is directed to a method for determining performance features of terminal equipment connected to a switching unit.

2. Description of the Related Art

U.S. Pat. No. 4,928,306 discloses a method for the—country-specific—setting of a telephone. Among other things, the attenuation of loudspeaker, the gain of the microphone as well as the protocol versions for national ISDN rules are set accordingly. Information is exchanged between the private branch exchange (PABX) and the telephone for implementation.

Within a private branch exchange, modern communication terminal equipment, both digital as well as analog, are connected to a call processing device via a peripheral processing and a following device handler. These three assemblies are a component part of a switching unit for the private branch exchange. The general structure of such a private branch exchange is described in the publication "ISDN im Büro, HICOM, Special Issue, Telcom Report and Siemens-Magazin Com" (ISDN 3-8009-3846-4) (specifically see pages 69 and 70 therein).

For calling performance features, a corresponding activation message is forwarded from the terminal equipment to the call processing unit, which subsequently makes the requested performance feature available for the terminal equipment. For example, such performance features are automatic redialing, callback, transfer of ringing, brokering, conference, timed reminder, parking, call number memory or operating a server such as, for example, voice mail, text-fax server or answering equipment. The functionality of the terminal equipment is prescribed by the employable performance features.

A distinction between the connection capability of the terminal equipment as differentiation between different marketing channels and different use classes is available given system-specific telephone terminal equipment for private branch exchanges. Even given terminal equipment that are otherwise technologically the same, a differentiation is established in view of the functionality, i.e. the convenience levels, and, thus, of the price as well.

SUMMARY OF THE INVENTION

The invention is based on the object of specifying a method of enabling a differentiated connection of technologically identical terminal equipment to various switching units.

The inventive method assures that specific groups of otherwise technologically identical terminal equipment are only connectable to predetermined switching units. This means that the technologically identical terminal equipment can be cost-beneficially fabricated in mass production but, due to the initialization evaluation, can be recognized by the respectively corresponding switching units as being connectable or not.

The switching units can be subsequently upgraded such that a different group or a plurality of groups of terminal equipment can be connected to them.

BRIEF DESCRIPTION OF THE DRAWINGS

The invention is described below with reference to an exemplary embodiment shown in the drawing.

DETAILED DESCRIPTION OF THE PRESENTLY PREFERRED EMBODIMENTS

The circuit parts of a private branch exchange necessary for an understanding of the invention are shown in the single FIGURE as a block circuit diagram. In detail, these are the communication terminal equipment EGx, EGy, EGz that are respectively connected to a call processing unit CP via a peripheral processing device PP and a following device handler DH. These latter three devices are a component part of a switching unit SWU. Further details about these individual circuit parts as well as about their interaction are disclosed in the initially cited reference, "ISDN im Büro". For example, the terminal equipment EGx, EGy, EGz are telephone sets.

Each of the terminal equipment EGx, EGy, EGz comprises what is referred to as a group identifier x, y, z. These identifiers x, y, z are deposited, for example, in a non-volatile memory.

The call processing unit CP comprises for example, three performance feature systems service feature packages. In detail, these are a basic performance feature system LSB, a first performance feature system LS1 and a second performance feature system LS2.

By pressing a key at one of the terminal equipment EG, this outputs an activation message M to one of the performance feature systems, for example to the basic performance feature system LSB. In response thereto, the performance feature system LSB makes a performance feature L called by this activation message M available to the terminal equipment EG.

Inventively, the group identifier x of the terminal equipment EGx is interrogated and recognized during the runup routine after the connection of the terminal equipment EGx to the switching unit SWU. It is specified via the group identifier that such a terminal equipment EGx can only access the performance features in the basic performance feature system LSB.

The analogous case applies to the terminal equipment EGy and EGz with the identifiers y and z, whereby the terminal equipment EGy can access the performance features from the first performance feature system LS1 and from the basic performance feature system and the terminal equipment EGz can access the performance features from the second performance feature system LS2 and from the basic performance feature system LSB.

The switching unit SWU is thus fashioned such that only terminal equipment EG with the group identifiers x or y or z can be connected. Given other embodiments of the switching unit SWU that are not shown here, only a single terminal equipment type with a single group identifier can be connectable. Likewise, the connectability can also be expanded to a plurality of terminal equipment types. Performance features prescribed by the group identifier x, y or z are made available to connectable terminal equipment EG, their functionality being essentially defined as a result thereof.

Inventively, thus, the allocation to specific switching units is implemented by an evaluation of the connectability on the basis of the group identifier in the runup routine, i.e. in the terminal equipment or, respectively, initialization identification. Given technologically identical terminal equipment, thus, a cost-reduction effect by enhancing the numbers of fabricated items can be achieved with processes exclusively controlled by software identification and without additional hardware outlay.

What is claimed is:

1. A method for assigning a service feature package to communication terminal equipment connected to a switching unit, the method comprising the steps of:

prior to connecting said terminal equipment to said switching unit, storing a group identifier in the terminal equipment which uniquely identifies the service feature package of a call processing unit;

offering a service feature package to the terminal equipment by the call processing unit;

selecting a respective service feature package on the basis of the group identifier corresponding to a setting in the call processing unit;

after connecting said terminal equipment to said switching unit, interrogating, initiated by a call processing unit in said switching unit, said identifier in the connected terminal equipment;

from said identifier, identifying, at the call processing unit, the respective service feature package uniquely identified by said identifier, and the call processing unit; and causing the connected terminal equipment to operate according to the respective service feature package uniquely identified by said identifier.

2. A method as claimed in claim 1, further comprising the step of storing a plurality of service feature packages in said call processing unit, respectively allocating to different group identifiers.

* * * * *